United States Patent [19]
DeMore et al.

[11] Patent Number: 6,106,029
[45] Date of Patent: Aug. 22, 2000

[54] PIPE COUPLING WITH IMPROVED PULL-OUT RESTRAINT

[75] Inventors: Louis DeMore; Scott Alan Butler, both of Bradford, Pa.

[73] Assignee: Dresser Industries, Inc., Dallas, Tex.

[21] Appl. No.: 09/112,524

[22] Filed: Jul. 9, 1998

[51] Int. Cl.$^7$ ................................................. F16L 17/00
[52] U.S. Cl. ...................... 285/322; 285/337; 285/348; 285/104
[58] Field of Search .................................. 285/337, 104, 285/348, 343, 322

[56] References Cited

U.S. PATENT DOCUMENTS

| | | | |
|---|---|---|---|
| 817,300 | 4/1906 | David | 285/104 |
| 2,755,109 | 7/1956 | Risley | 285/348 |
| 2,779,610 | 1/1957 | Risley | 285/348 |
| 4,070,046 | 1/1978 | Felker et al. | 285/337 |
| 4,092,036 | 5/1978 | Sato et al. | 285/337 |
| 4,569,542 | 2/1986 | Anderson et al. . | |
| 4,664,426 | 5/1987 | Ueki | 285/337 |
| 5,100,183 | 3/1992 | Montesi et al. . | |
| 5,645,285 | 7/1997 | Percebois et al. | 285/104 |
| 5,779,285 | 7/1998 | Robison | 285/337 |

FOREIGN PATENT DOCUMENTS

| | | | |
|---|---|---|---|
| 334380 | 9/1989 | European Pat. Off. | 285/337 |

OTHER PUBLICATIONS

2" IPS Universal Maxi–Hold–By Coupling Systems, Inc. (Dates Unknown).

*Primary Examiner*—Eric K. Nicholson
*Attorney, Agent, or Firm*—Daniel Rubin

[57] ABSTRACT

A pipe coupling for the joining of plain end plastic or metallic pipe that includes an annular follower, a tubular middle ring extending between opposite followers, an annular gasket within the follower contiguous to the middle ring and a restrainer unit within the follower comprising a lock ring having a plurality of arcuately spaced radial slots for slideably supporting individual gripper segments that are operative during tightening installation of the follower about a received pipe end to effect a penetrating restraining grip against the surface of the pipe end.

6 Claims, 2 Drawing Sheets

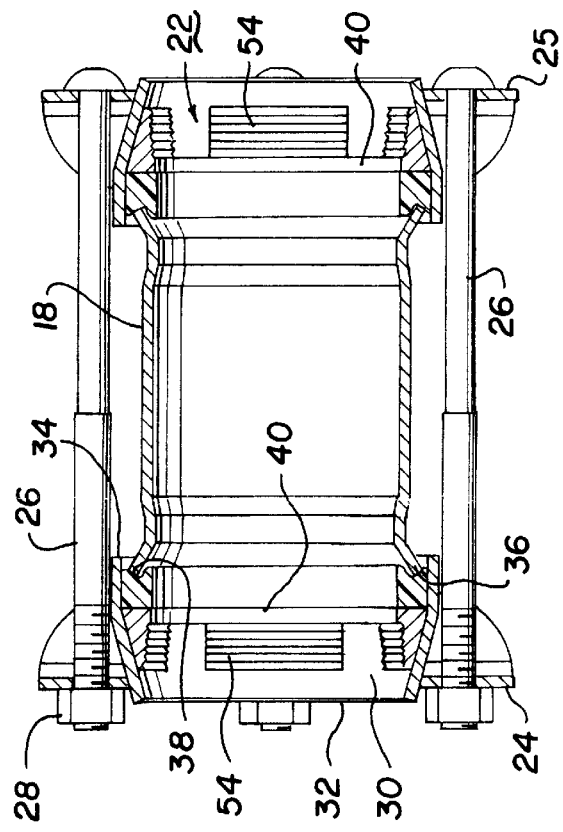
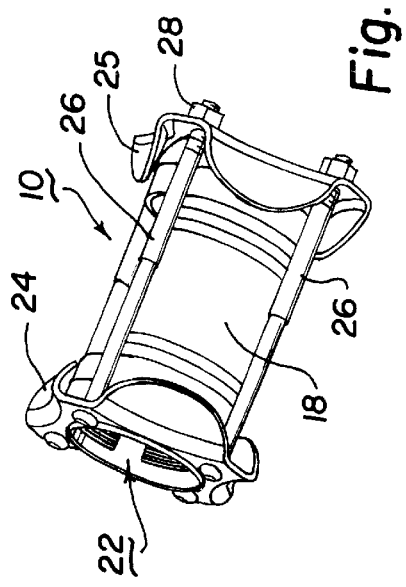
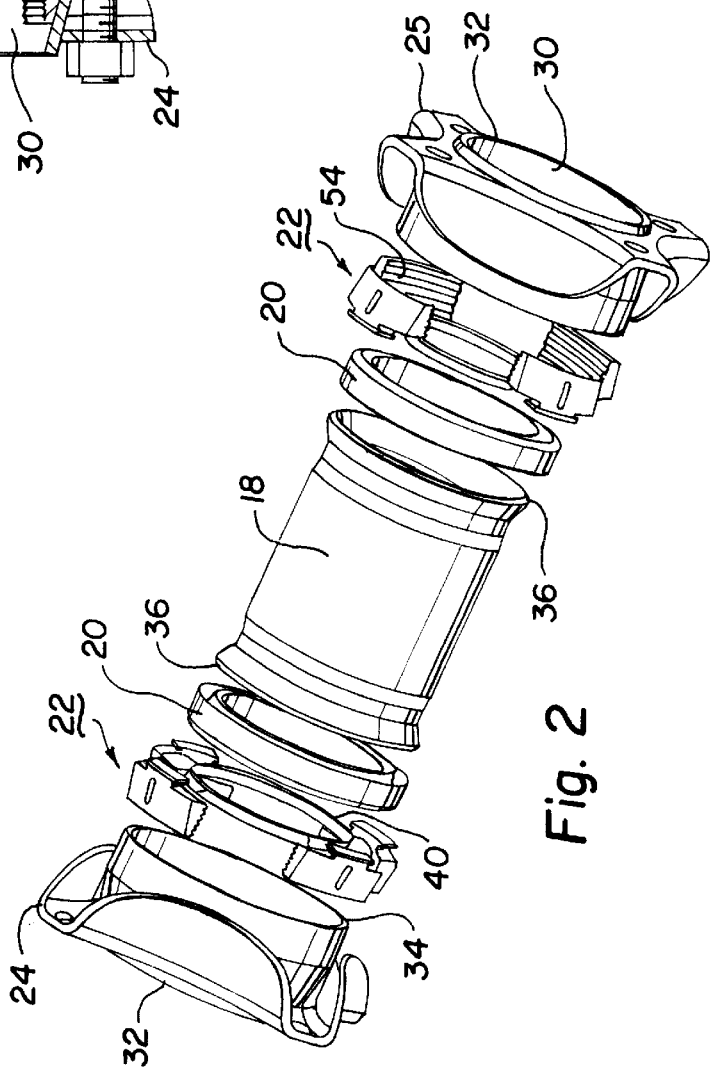
Fig. 3
Fig. 1
Fig. 2

PIPE COUPLING WITH IMPROVED PULL-OUT RESTRAINT

FIELD OF THE INVENTION

The field of art to which the invention pertains includes the art of pipe joints and pipe couplings.

BACKGROUND OF THE INVENTION

Pipe couplings are commercially available from a variety of manufacturing sources and are used extensively for underground pipe installations as in the distribution of natural gas. It is known in such couplings to employ gripping members of sorts in order to prevent in-service uncoupling of the joint by longitudinal drawbar forces imposed on the coupled pipe section. Reliability is essential in the construction of such couplings while cost of fabrication is likewise essential to the well being of the manufacturer for competing pricewise in the markets in which such couplings are sold.

With the advent of plastic pipe and tubing and their approval by regulating governmental agencies for natural gas transmission, the previous problem of pipe pull-out from a coupled joint increased many times over to on the order of ten fold as compared to metal pipe. One factor most contributing to this problem is the much greater linear coefficient of thermal expansion for plastic pipe as compared to steel pipe. By way of example, Aldyl "A" polyethylene piping marketed by Dupont has a linear coefficient of thermal expansion stated by the manufacturer to be: $9 \times 1^{-5}$ in/in F° as compared to $6.5 \times 10^{-6}$ in/in F° for steel pipe. Notwithstanding, government agencies regulating installation of such systems require that each joint sustain the longitudinal pullout or thrust forces caused by contraction or expansion of the piping or by anticipated external or internal loading to within prescribed limits. (Title 49 Section 192 "Transportation of Natural and Other Gas by Pipeline—Minimum Safety Regulations"—Fed. Vol. 35, No. 161).

While the degree of pipe restraint or lock up imposed on the coupled joint is critical, it is at least equally critical that adequate gasket compression be achieved about the coupled pipe in the course of coupling installation to insure a seal against leakage of line content.

BACKGROUND OF THE PRIOR ART

A typical bolt type coupling construction utilized in the prior art for natural gas service, as disclosed for example in U.S. Pat. No. 2,779,610, comprises a combination of a gasket to effect sealing and a lock ring to restrain the pipe against pull-out. Such couplings are operationally characterized by a grip imposed on the pipe by the lock ring that normally occurs before or substantially simultaneous with attainment of the required gasket pressure for sealing.

To the extent pipe grip by the lock ring occurs before gasket pressure is achieved, some slight displacement of the pipe ends may occur relative to each other in the course of completing the gasket seal. There are, however certain installations where, for example, the pipe ends are abutting or restrained such as in a final tie-in that precludes pipe displacement to enable completion of the gasket seal. There are likewise installations in which the pipe per se is slightly out-of-round such that the lock ring is circumferentially less than entirely effective in its intended grip of the received pipe end. In the former situation, should prior coupling construction effect lockup before the required gasket seal is achieved about the coupled pipe, the required gasket seal can never be achieved, and the fact that it has not been achieved could readily go unnoticed. That is, the workman installing a gasket in some remote ditch may be unaware of the lack of gasket seal and which condition may not be recognized until long after the pipe line is completed and buried. Even a preliminary test may not reveal the condition since a partial but incomplete seal is known to appear adequate on initial test. It can be appreciated that where the line content is natural gas or the like, the potential explosion hazard represented by leaks can be horrendous.

In recognition of the foregoing, U.S. Pat. Nos. 4,569,542 and 5,100,183, incorporated herein by reference, disclose an initial axial clearance of controlled dimension between a back face of the gasket and the front face of the lock ring. By virtue of the clearance, bolt tightening enables gasket sealing pressure to be achieved about the coupled pipes sequentially prior to an effective grip on the pipe being obtained by the lock ring.

While each of the foregoing coupling constructions have functioned well for their intended purposes, it has long been desired to enhance the restraining force imposed against the pipe wall particularly in those instances in which the peripheral surface of the pipe is even slightly out-of-round at the installation site. Furthermore, it has long been desired to reduce fabrication costs in the construction of such couplings.

OBJECTS OF THE INVENTION

It is therefore an object of the invention to effect an improved pipe coupling construction of the bolted lock type able to effect enhanced restraint of the coupled pipe against pull-out as compared to similar purpose pipe couplings of the prior art.

It is a further object of the invention to effect the previous object with a coupling suitable to accommodate pipe having out-of-round peripheral surfaces at the site of installation.

It is a still further object of the invention to effect the foregoing objects with a less costly construction as compared to prior constructions utilized therefor.

SUMMARY OF THE INVENTION

This invention relates to an improved pipe coupling of the bolted lock type for use on pipelines carrying high pressure combustible gas as to enable both a lock grip and gasket pressure to be achieved reliably in accordance with prescribed standards of installation. More specifically, the invention relates to such a pipe coupling of improved structure affording enhanced operability and lower fabrication costs compared to similar purpose couplings of the prior art.

The foregoing is achieved in accordance with the invention by a substantially all metal coupling construction that includes an annular follower, an annular resilient gasket and a restraining mechanism within the follower. The latter comprises an annular lock ring containing arcuately spaced slots in which to support individual gripper locking segments for effecting a pipe grip during installation. The lock ring and segments are axially positioned within the follower at each end of the coupling between the outer distal end of the follower and the gasket. The back face of the gasket is constructed having a smooth contour which when the gasket is uncompressed is positioned to afford a controlled axial clearance adjacent to a juxtaposed confronting face of the lock ring thereat. The front face of the gasket includes an annular recess in which to receive the distal end of the middle ring.

As draw bolts on the coupling are tightened in the process of installation, the coupling followers are drawn toward each other to force the individual segments of the restraining mechanism to slideably descend against the pipe wall while causing the gaskets to be compressed against the middle ring. The operation of the segments causes an enhanced restraining force against the pipe as compared to previous type installations. Concomitantly therewith, opposite ends of the middle ring are received in their respective followers for gasket pressure to be achieved.

To effect the above, the lock ring, defines at uniform arcuate spacings, a plurality of uniformly spaced radial recesses in which to receive individual locking segments in an initially floating relation before slideably descending into a grip against a contained pipe wall. The gripper segments are supported in the ring slots but extend laterally behind the ring and are comprised of a powder metal composition to be operatively effective to grip the wall of the received pipe end when compressed thereat. The floating feature of the segments substantially enhance the ability of the coupling to restrain all pipe including those having out-of-round surfaces at the site of installation. At the same time, the powdered metal of which the gripper segments are formed, eliminates need for secondary operations such as machining or cutting normally required for metal grippers. Additives can be blended in a well known manner to produce a gripper segment with specific material properties such as yield strength, hardness and corrosion resistance. For the embodiment to be described, the segments conform to the material designation code FC-0208-50 of the Materials Powder Industries Federation (MPIF) Standard 35 Material Standards for P.M Structural Parts.

Being that the segments are individually responsive in slideably descending within the recess slots of the ring, they function collectively to more compatibly accommodate dimensional variations in the surface of a received pipe if any. As a consequence, more comprehensive and enhanced engagement of the grippers against the pipe surface is achieved for more uniformly and reliably restraining the pipe against potential post installation pull-out.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 1 is an isometric plan view of the coupling hereof;

FIG. 2 is a longitudinal isometric exploded view of the coupling hereof;

FIG. 3 is a sectional elevation of the coupling hereof in its uncoupled relation;

DESCRIPTION OF THE PREFERRED EMBODIMENT

Figure 4:
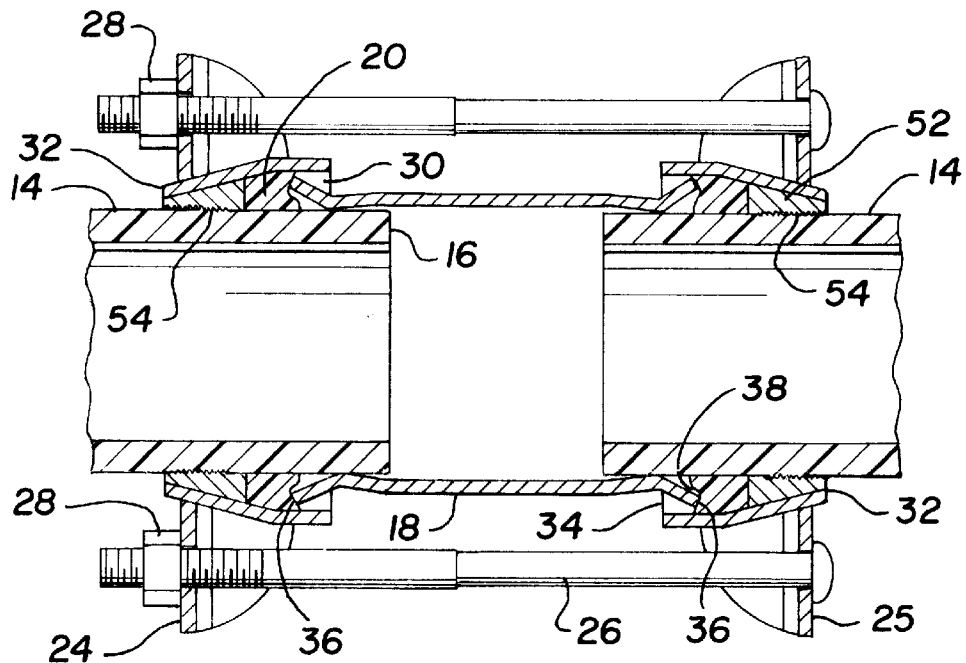
FIG. 4 is a sectional elevation of the coupling hereof in its coupled relation.

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated a coupling 10 adapted to couple the opposite ends 16 of plastic pipes 14 (FIG. 4). Comprising coupling 10 is a tubular steel or cast iron middle ring 18 and opposed annular followers 24 and 25 likewise of steel or cast iron for internally receiving annular elastomeric rubber gaskets 20. Axially juxtaposed behind each gasket is a restrainer unit 22, as will be described, for engaging a received pipe end 16 and impose a pull-out restraint thereagainst. The opposite followers 24 and 25 contain a plurality of longitudinal steel draw bolts 26 and steel companion nuts 28. Each follower 24 and 25 includes a coaxial tubular portion 30 that is diametrically enlarged longitudinally from its outer end 32 to its inner end 34 for containing gasket 20. Each distal end 36 of middle ring 18 is flared to engage recess 38 in gasket 20.

Figure 5:
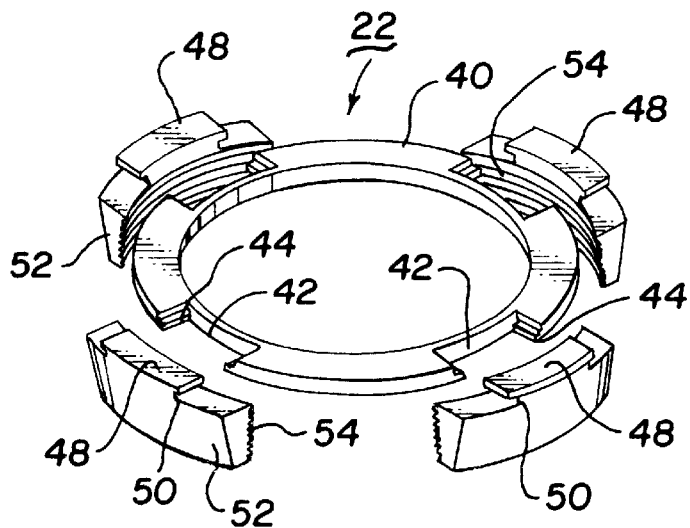
FIG. 5 is an isometric front view of the restrainer unit in its unassembled relation.
Figure 6:
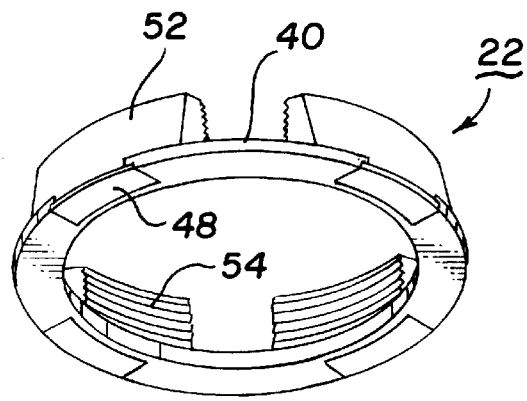
FIG. 6 is an isometric view of the restrainer unit in its assembled relation.

As best seen in FIGS. 5 and 6, restrainer unit 22 hereof is comprised of an annular ring 40 formed of a polymer-plastic such as polyethylene and containing four equally spaced radially outward recesses 42 defining on opposite edges an inward extending arcuate shoulder 44. Adapted to be received and supported in each of the recesses is an individual gripper segment 46 integrally containing on its front face an arcuate flange 48 undercut at 50 for slideable receipt and support against ring shoulder 44. Laterally secured to flange 48 is an arcuate segment bar 52 containing on its underside a plurality of elongated gripper teeth 54. The gripper segment bars 52 are preferably comprised of a powdered metal composition, as described supra, having the desired material properties and in the preferred embodiment is comprised of a composition conforming to material designation code FC-0208-50. It will be appreciated that each of the individual flanges 48 when received into one of the respective slots 42 against shoulder 44 will, in effect, be afforded a floating relation with respect to any pipe wall periphery encountered by teeth 54.

For installation, opposite pipe sections 14 (FIG. 4) are inserted inward of opposite coupling ends 32 until suitably received within middle ring 18. Thereafter, draw bolts 26 are tightened causing opposite followers 24 to advance over the middle ring toward each other. Advance is continued while the distal end 36 of middle ring 18 is forced inward of gasket recess 38 and gripper teeth 54 initiate penetration of the pipe surface. On a desired torque level of bolts 26 being achieved, gasket 20 is compressed between the front surface of restraining unit 22, and the distal end 36 of middle ring 18. Once compressed in this manner, the gasket forms an annular sealing relation about pipe section 14 therein.

Being that retainer unit 22 is comprised of a plurality of individually actuated gripper segments 52, any out-of-round or other surface irregularities on the outer wall of pipe 14 can be readily accommodated in a penetrating gripping restraint by gripper teeth 54. At the same time, being that the restrainer unit is of a substantially all plastic composition other than the powdered metal composition of segments 52, a substantial cost reduction is contributed in the production of such couplings as compared to similar purpose couplings of the prior art. Even the powdered metal segment per se represents a significant cost reduction by eliminating cost of cutting and machining typically associated with metal type gripping elements utilized in the prior art. The virtues thereof should be readily appreciated in that the lock ring provides a rigid support for the gripping segments during assembly, shipping and fit yet allows for free movement of the segments during installation enabling the segments to move individually to conform to any pipe surface eccentricities. As a consequence, the design hereof improves the ability of the coupling to restrain all pipe including pipe which is out-of-round.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A pipe coupling for joining plain end pipe and including:

a middle ring adapted to receive at least one pipe end to be coupled;

an annular elastomeric gasket located to be intervening between an end of said middle ring and a pipe end received in said middle ring;

a restraining unit including a plurality of individual arcuately spaced gripper segments located axially juxtaposed to said gasket and supported on said restraining unit so as to afford a floating relation with respect to the outer wall of a received pipe end and an annular ring having a plurality of radial slots defined arcuately spaced about the periphery of said ring with each of said gripper segments being slideably received radially within one of said ring slots;

each of said gripper segments having an arcuate flange laterally secured to an end face of said gripper segment with each of said flanges being slidably received within a radial slot of said restrainer ring for effecting said segment support; and a follower about a distal end of said middle ring and including a plurality of fastener elements which when tightened advance the follower toward the middle ring to concomitantly cause said gripper segments to effect a restraining grip of a received pipe end while compressing said gasket into a sealing relation about the pipe end thereat.

2. A pipe coupling in accordance with claim 1 in which each of said restrainer ring slots include a radial shoulder against which a received arcuate flange of a gripper segment is slidably supported.

3. A pipe coupling in accordance with claim 2 in which each of said gripper segments includes a plurality of parallel teeth arcuately extending about an under surface of the segment and said teeth are operative during the advance of said follower to penetrate into the peripheral surface of a pipe end thereat for effecting a restraining grip of the pipe end.

4. A pipe coupling in accordance with claim 3 in which said gripper segments are comprised of a powdered metal composition.

5. A pipe coupling in accordance with claim 3 in which said restrainer ring is of a polymer plastic composition.

6. A pipe coupling in accordance with claim 1 in which said middle ring is adapted to receive a pair of pipe ends to be coupled with one pipe end at each opposite end of said middle ring and said gasket and said follower are included at each end of said middle ring about the received pipe end thereat.

\* \* \* \* \*